United States Patent
Ratledge et al.

[11] 3,819,530
[45] June 25, 1974

[54] STABILIZED WAX EMULSIONS

[75] Inventors: Edward L. Ratledge, Claymont Heights, Del.; Richard E. Ware, Trainer, Pa.

[73] Assignee: Sun Oil Company, Philadelphia, Pa.

[22] Filed: July 15, 1968

[21] Appl. No.: 744,705

[52] U.S. Cl.............. 252/311.5, 106/271, 252/70, 106/272, 106/285
[51] Int. Cl............................................. B01j 13/00
[58] Field of Search ........ 252/311, 311.5, 316, 318, 252/70; 106/271, 272, 285

[56] References Cited
UNITED STATES PATENTS
2,560,148  7/1951  Arabian .......................... 252/311.5
3,192,030  6/1965  Mills .............................. 252/311.5

OTHER PUBLICATIONS
Chemical Abstracts Vol. 45, col. 262c & Vol. 46 col. 5400h.

Primary Examiner—John D. Welsh
Attorney, Agent, or Firm—Mr. G. L. Church, Esq.; Mr. J. E. Hess, Esq.; Mr. R. P. Maloney, Esq.

[57] ABSTRACT

Wax-in-water emulsion compositions containing 0.05 to 10 percent of a stability improving compound of the structural formula:

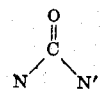

wherein N and N' are substituents each selected from the group consisting of —$NH_2$, —$NHCH_3$, —$NHC_2H_5$, —$CH_3$, —$C_2H_5$ and to the methods of preparing said compositions.

1 Claim, No Drawings

STABILIZED WAX EMULSIONS

BACKGROUND OF THE INVENTION

Wax emulsion compositions, and particularly wax-in-water emulsions, are well known standard articles of commerce which have many uses. One of the more widely known applications of wax-in-water emulsions is that of a polishing composition. Polishing compositions can be applied to wood, leather, floor tiles, automobile finishes, household appliances and many other articles whose appearance can be enhanced by a coating of wax. Also, wax-in-water emulsion compositions (hereinafter referred to as wax emulsions) have been shown to be suitable for use in the preparation of paper products, textiles and many other articles of commerce.

More recently, newly developed wax emulsions have been disclosed to be particularly suitable for regulation of transpiration of growing plants. Copending United States patent applications, Ser. No. 469,870, filed July 6, 1965 and now U.S. Pat. No. 3,410,678 issued Nov. 12, 1968 and Ser. No. 638,288, filed May 15, 1967 (now U.S. Pat. No. 3,388,992, issued June 18, 1968) disclose specific wax emulsion compositions particularly effective as anti-transpirants when applied to growing plants.

One problem normally encountered when using wax emulsions is their inherent lack of stability. Unstabilized wax emulsions often break and separate into a liquid phase and a solid phase or sometimes become a gel or a thick viscous cream which will not flow and thus lose their liquid characteristics. These undesirable effects of wax emulsion instability can occur as a result of storage, shipping or alternate freezing and thawing of the liquid emulsion. Freezing and thawing most often occur during shipping or storage in colder climates where the emulsion is sometimes exposed to temperatures well below the freezing point of water. The term "freeze-thaw cycle" designates a procedure wherein the liquid emulsion is exposed to temperatures below the freezing point of the emulsion for a period of time sufficient for the emulsion to be frozen to a hard solid mass. Thereafter the frozen emulsion is subject to a temperature above its freezing point for a period of time sufficient to thaw the entire emulsion. Normally, when a wax emulsion is exposed to a freeze-thaw cycle, the emulsion thickens to a non-flowable, gel-like composition which can no longer be handled in apparatus designed for flowable liquids. For this reason, it is not uncommon to see containers of wax emulsions labelled with the warning "KEEP FROM FREEZING".

Wax emulsions usually are prepared as concentrates having 20 to 60 weight percent wax, 1 to 10 weight percent emulsifying agents with the rest of the composition being made up of water and additives including oil, stabilizers, fungicides, insecticides, etc. The wax emulsion is normally packaged and shipped by the manufacturer in a concentrate form preferably containing 40 to 60 weight percent wax. The concentrate emulsion if desired can be easily diluted to a lower wax-in-water ratio by the customer using the product by simply adding more water to the concentrate. Concentrations as low as 0.1 to 10 weight percent wax-in-water are not uncommon in many applications.

For most customer applications, a thin flowable homogeneous liquid emulsion is the desired form. Unstabilized wax-in-water emulsions which have gelled or have become a thick viscous cream as a result of instability are usually unsuitable for practical use, because they are difficult to disperse in water. Therefore, it is advantageous to provide a stable wax emulsion which will not break, thicken, gel or cream when subject to freeze-thaw cycles or other conditions which result in emulsion breakdown.

We have now discovered new improved wax emulsions and methods of their preparation which provide compositions having improved emulsion stability characteristics. As hereinafter given all parts and percentages are by weight unless otherwise specified.

BRIEF SUMMARY OF THE INVENTION

The present invention relates to improved wax emulsion compositions. More particularly, the present invention relates to improved freeze-thaw stable wax emulsions and to methods of their preparation. Specifically, the present invention relates to wax emulsion compositions containing 0.05 to 10 percent of a stability improving additive having the general structural formula:

wherein N and N' are substituents each selected from the group consisting of $-NH_2$, $-NHCH_3$, $-NHC_2H_5$, $-CH_3$ and $-C_2H_5$ and to methods of preparing those compositions.

DESCRIPTION OF THE INVENTION

We have now discovered wax-in-water emulsion compositions which have improved resistance to creaming or thickening particularly resulting from freezing. More specifically, we have discovered that the addition of 0.05 to 10 percent of an additive having the structural formula:

wherein N and N' are substituents each selected from the group consisting of $-NH_2$, $-NHCH_3$, $-NHC_2H_5$, $-CH_3$ and $-C_2H_5$ provides a wax-in-water emulsion having improved freeze-thaw stability.

The wax emulsion stability improving additives suitable for use in the compositions of the present invention include urea, methyl urea, 1,3-dimethyl urea, ethyl urea, 1,3-diethyl urea, 1-ethyl-3-methyl urea, acetamide, N-methylacetamide, N-ethylacetamide, propionamide, N-methylpropionamide, N-ethylpropionamide, acetone, 2-butanone and 3-pentanone. All of the above-named compositions are water soluble and can be added directly to the wax emulsion or can be dissolved in the water of the emulsion at any time prior to or after the wax-in-water emulsion composition has been formed.

The minimum of stabilizing additive suitable for use in the compositions of the present invention should be at least 0.05 percent based on the weight of the whole composition. For practical purposes, the maximum of 10 percent additive is suitable. The preferred concentration of stabilizing additive in the wax-in-water emulsion compositions of the present invention is 2.0 to 5.0 percent. The stabilizing additive can be added to a wax-in-water emulsion concentrate containing 20 to 60 weight percent wax or to a dilute wax-in-water emulsion containing as little as 0.1 to 10 weight percent wax. Therefore, the wax emulsion compositions of this invention can contain 0.1 to 60 weight percent wax. In all cases, the quantity of stabilizer added to the wax-in-water emulsion can be in the range of 0.05 to 10 percent.

Waxes suitable for use in the wax-in-water emulsion compositions of the present invention include beeswax, candellia wax, ozocerite, japan wax, carbowax, Fischer-Tropsch waxes, carnauba wax and petroleum waxes. Petroleum wax includes paraffin wax and microcrystalline wax as well as mixtures of both. For purposes of the present invention, petroleum paraffin waxes are preferred. Particularly preferred are petroleum paraffin waxes having melting points in the range of 122° to 160°F. AMP. The most preferred petroleum paraffin waxes are those melting within the range of 126° to 135°F.

A basic formula for wax emulsions suitable for use as a wax coating is 1 to 60 parts wax, 40 to 98 parts water and 1 to 10 parts of an emulsifying agent. Other suitable additives can be included in this formula. Wax emulsion formulations suitable for use in the compositions of the present invention can also contain 0.1 to 30 parts mineral oil per 100 parts of water in the composition.

The wax emulsion compositions of the present invention can also contain other additives. For example, polishing or paper-coating compositions often contain synthetic polymers such as polystyrene, polyvinylchloride or polyethylene. Wax emulsions suitable for agricultural applications often contain mineral oil, insecticides, fungicides, dyes and pigments. All wax-in-water emulsions normally unstable to freeze-thaw cycles of temperature are included in the present invention.

Ionic or non-ionic surface active compounds can be employed as emulsifying agents, normally in the concentration range of 0.1 to 10 percent by weight. Surface active agents are suitable as a class for use according to the present invention. The nature of surface active agents is well known, and such agents generally have an oleophilic portion of the molecule, usually of hydrocarbon nature, and another polar portion of the molecule, which may be provided by various functional groups such as hydroxyl, sulfate, carboxyl, carbonyl, amino, nitro, amido, ether sulfonate, phosphate, phosphite, etc. Examples of suitable classes of surface active agents which can be employed are: alkali metal salts of fatty acids, alkali metal salts of sulfated fatty acid, fatty acid glycerides, sulfonated or sulfated fatty acid esters or amides, alkali metal alkyl sulfates, alkali metal alkyl sulfonates, alkali metal aryl sulfonates, alkali metal alkyllauryl sulfonates, quaternary ammonium halides, alkali metal salts of alkylated naphthalene, sulfonic acid, polyethylene sorbitol esters of fatty acids, fatty acid amides or alkanol amines, condensation products of ethylene oxide and polyalkylene glycols, sorbitan esters, alkyl substituted phosphoric acids, alkali metal salts of alkyl phenol sulfonates, etc. Examples of individual surface active agents which can be employed are given for example in Kirk et al., ENCYCLOPEDIA OF CHEMICAL TECHNOLOGY, Vol. 8, 2nd Ed., 117–154, (1965), and also in ENCYCLOPEDIA OF SURFACE ACTIVE AGENTS, Sisley, J. P. and Wood, P. J., Chemical Publishing Co., New York, New York (1964).

Although anionic and cationic emulsifying agents are suitable in general for use in the emulsion compositions of the present invention, non-ionic emulsifying agents are preferred. Particularly suitable surface active agents for use according to the invention are the polyalkylamines and fatty acid amines, sorbitan esters of polyoxyethylene glycol, sorbitan monostearate and others of which numerous examples are given in the literature references referred to in the preceding paragraph.

A particular advantage gained by the compositions of the present invention can be found in agricultural applications. For example, in copending U.S. Pat. application Ser. No. 469,870 now U.S. Pat. No. 3,410,678 issued Nov. 12, 1968, it is disclosed that wax-in-water emulsion compositions containing petroleum paraffin wax melting in the range of 122° to 160°F. and petroleum hydrocarbon oil characterized as having:

| | |
|---|---|
| Gravity, °API/60°F. | 31.0–36.0 |
| Viscosity, SUS/100°F. | 60–120 |
| Viscosity, SUS/210°F. | 34–38 |
| Flash Point, °F. | 300–400 |
| Fire Point, °F. | 375–400 |
| Pour Temperature, °F. | −10 to +20 |
| Unsulfonated Residue, wt. % (ASTM) | 92.0–99.9 |
| Refractive Index, 25°C. | 1.4660–1.4690 |
| Gel Aromatics, wt. % | 8.0 max. |
| Distillation range at 10 mm. Hg. | 300–500°F. | are effective as anti-transpirants when applied to the foliar parts of growing plants. It is disclosed that a wax emulsion containing 0.125 to 4.875 parts of petroleum wax having a melting point in the range of 122° to 160°F. per 100 parts of water, 0.125 to 4.875 parts of a petroleum hydrocarbon characterized as having a maximum of 8.0 weight percent gel aromatics and a distillation range at 10 mm. Hg. of 300° to 500°F. and an emulsifying agent is a particularly effective anti-transpirant composition for growing plants. The above-disclosed anti-transpirant wax emulsion compositions can be further improved by the addition of any one or mixtures of the stabilizing additives hereinabove disclosed that are suitable for improving the stability of wax emulsion compositions.

One problem often recognized in using some wax emulsions is their susceptibility to microbial attack in storage. For example, it is not uncommon to open a container of a wax emulsion which has been in storage and find the entire emulsion permeated with bacterial growth. This infection of the emulsion usually results in the emulsion solidifying, thereby becoming unsuitable for use. It has now been discovered, however, that urea also inhibits microbial growth in wax emulsions thereby further contributing to the stability and consequently the usefulness of the composition. Another advantage realized by use of urea containing anti-transpirant wax emulsion composition is that the urea serves as a nutrient to the plant when the emulsion is applied thereto. Thus, it is shown that several advantages can be gained when the stabilized wax emulsions hereinabove disclosed are used.

As previously noted, wax emulsions are usually prepared and sold in the concentrate form, i.e., 20 to 60 weight percent wax in the emulsion. The agricultural applications such as those disclosed in the copending patent applications noted above, the concentration of wax in the diluted emulsion can be as low as 0.1 percent, but is preferably in the range of 0.25 to 5.0 parts wax per 100 parts of water. Therefore, the stabilized wax-in-water emulsions of the present composition can contain 0.1 to 60 weight percent wax in the emulsion and the component referred to as wax can be a combination of wax and oil where the emulsion is a wax-oil-in-water composition.

As a means for illustrating one embodiment of the methods and compositions of the present invention, the following examples are given:

EXAMPLE I

A petroleum paraffin wax characterized as having a melting point of 127°F. (AMP), a penetration at 77°F. of 33 (ASTM D-1321) and a SUS viscosity at 210°F. of 44 was emulsified in the following manner:

a. 500 grams of the paraffin wax was melted at a temperature of 175°F. and blended with 60 grams of mineral oil, 26 grams of sorbitan monostearate and 24 grams of polyoxyethylene sorbitan monostearate.

b. 390 grams of water were heated to a temperature of 185°F. and slowly blended into the composition of (a) with continuous agitation.

c. The blend of step (b) at a temperature of 170°F. was a thick viscous liquid which was thereafter cooled to the temperature of 158°F. at which point the mixture inverted to a wax-in-water emulsion and became a thin flowable liquid.

d. The product of step (c) was cooled to room temperature to provide a wax-in-water emulsion having a Brookfield viscosity of 105 cps.

EXAMPLE II

Using the wax emulsion composition of Example I, the following compositions were prepared by adding the specified stabilizer to 100 parts of the wax emulsion and stirring the composition until the stabilizer completely dissolved:

| | |
|---|---|
| (a) | 2.0 parts urea |
| (b) | 2.5 parts methyl urea |
| (c) | 3.0 parts 1,3-dimethyl urea |
| (d) | 4.0 parts ethyl urea |
| (e) | 2.0 parts acetamide |
| (f) | 2.0 parts acetone |
| (g) | composition of Example I (control) |

Each wax emulsion composition along with a sample of the composition of Example I was placed in a cold chamber at 0°F. for a period of 24 hours the results of which were that each wax emulsion sample froze to a hard solid mass. The samples were then removed from the cold chamber and permitted to thaw at 72°F. for 24 hours. Each sample was then evaluated by running the Brookfield viscosity. By this method, the viscosity of each of the compositions was determined where possible. This freeze-thaw and testing procedure was repeated a total of five times on the seven samples disclosed.

The results of this evaluation are given in Table I below wherein each of the stabilized wax emulsion compositions (Samples a through f) exhibit the improved stability of those compositions over the unstabilized wax emulsion compositions represented by Example I.

Table I

| | | Parts Stabilizer Per 100 parts Wax Emulsion | FREEZE-THAW CYCLES Brookfield Viscosity cps. | | | | | |
|---|---|---|---|---|---|---|---|---|
| | | | 0 | 1 | 2 | 3 | 4 | 5 |
| (a) | Urea | 2.0 | 125 | 180 | 225 | 260 | 250 | 265 |
| (b) | Methyl urea | 2.5 | 103 | 135 | 170 | 185 | 210 | 245 |
| (c) | 1,3-Dimethyl urea | 3.0 | 105 | 140 | 140 | 160 | 200 | 190 |
| (d) | Ethyl urea | 4.0 | 100 | 135 | 160 | 185 | 190 | 190 |
| (e) | Acetamide | 2.0 | 100 | 105 | 185 | 305 | 275 | 335 |
| (f) | Acetone | 2.0 | 110 | 165 | 190 | 235 | 275 | 285 |
| Example I Control | | 0 | 105 | ← Non-flowable gel → | | | | |

EXAMPLE III

As a means of further illustrating the compositions and methods of the present invention, the procedures of Example II were repeated with the exception that the following stabilizing additives were tested by adding 1 part of the stabilizer to 100 parts of a wax emulsion identical to that of Example I.

| | |
|---|---|
| (a) | Ethyl urea |
| (b) | 1-Ethyl, 3-methyl urea |
| (c) | N-methylacetamide |
| (d) | N-ethylacetamide |
| (e) | Propionamide |
| (f) | N-methylpropionamide |
| (g) | N-ethylpropionamide |
| (h) | Methyl ethyl ketone |
| (i) | 3-Pentanone |

Each of the above compositions was subject to the freeze-thaw testing procedures in the identical manner disclosed in Example II with substantially equivalent results being obtained. Thus, it is demonstrated that each of the stabilizing additives disclosed herein is effective in improving the stability of petroleum paraffin wax-in-water emulsion compositions. Other waxes including microcrystalline petroleum wax, beeswax, candellia wax, ozocerite, japan wax, carnauba wax, carbo wax and Fischer-Tropsch wax can be substituted for the petroleum paraffin wax disclosed in Examples I through III given above with substantially equivalent results being obtained.

EXAMPLE IV

To further define the methods and compositions of the present invention, several compounds having a chemical structure similar to the stabilizers hereinabove disclosed were added to wax emulsion compositions identical to the composition of Example I and tested in the identical manner as the compositions of Example II. The results of this evaluation appear in Table II below wherein it is clearly shown that chemical compounds similar to, but different from, the stabilizers herein disclosed, fail to provide improved stability against freeze-thaw breakdown of wax emulsion compositions.

Table II

| Stabilizer | Parts Per 100 parts Water | FREEZE-THAW CYCLES Brookfield Viscosity cps. 0 1 2 3 4 5 |
|---|---|---|
| Ethyl methyl carbamate | 3.5 | 115 ← Non-flowable gel → |
| Thio urea | 2.5 | 140 ← Non-flowable gel → |
| Formaldehyde | 2.5 | 130 ← Thick viscous cream → |
| Acetaldehyde | 4.0 | 120 ← Thick viscous cream → |

We claim:
1. An improved wax emulsion composition consisting essentially of 0.1 to 60 percent petroleum wax, 40 to 98 percent water, an emulsifying agent and 2.0 to 5.0 percent urea.

* * * * *